US011988522B2

(12) United States Patent
Margin et al.

(10) Patent No.: US 11,988,522 B2
(45) Date of Patent: May 21, 2024

(54) METHOD, DATA PROCESSING APPARATUS AND COMPUTER PROGRAM PRODUCT FOR GENERATING MAP DATA

(71) Applicant: GRABTAXI HOLDINGS PTE. LTD., Singapore (SG)

(72) Inventors: Adrian-Ioan Margin, Bucharest (RO); Bogdan-Andrei Gliga-Hambet, Bucharest (RO); Xiaocheng Huang, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 18/036,244

(22) PCT Filed: Jan. 3, 2022

(86) PCT No.: PCT/SG2022/050001
§ 371 (c)(1),
(2) Date: May 10, 2023

(87) PCT Pub. No.: WO2022/150013
PCT Pub. Date: Jul. 14, 2022

(65) Prior Publication Data
US 2023/0384117 A1 Nov. 30, 2023

(30) Foreign Application Priority Data
Jan. 6, 2021 (SG) .............................. 10202100119S (51) Int. Cl.
*G01C 21/30* (2006.01)
*G01C 21/00* (2006.01)
(Continued)

(52) U.S. Cl.
CPC ..... *G01C 21/3815* (2020.08); *G01C 21/3841* (2020.08); *G06V 10/26* (2022.01); *G06V 10/82* (2022.01)

(58) Field of Classification Search
CPC ............ G01C 21/3815; G01C 21/3841; G06V 10/26; G06V 10/82; G06N 3/045; G01S 19/39
See application file for complete search history.

(56) References Cited

U.S. PATENT DOCUMENTS 7,660,441 B2    2/2010  Chen et al.
2018/0189323 A1*  7/2018  Wheeler ................. G06F 16/29
(Continued)

OTHER PUBLICATIONS

International Search Report and Written Opinion dated Apr. 6, 2022 which was issued in connection with PCT/SG2022/050001.
(Continued)

*Primary Examiner* — Nga X Nguyen
(74) *Attorney, Agent, or Firm* — Buckley, Maschoff & Talwalkar LLC (57) ABSTRACT

Aspects concern a method for generating map data, the method including: generating of a plurality of cells of a real space area, each cell representing a two-dimensional subspace of the real space area, wherein each of the cells comprise at least one global positioning system (GPS) point, and wherein the real space area comprises a road network; determining a number of GPS points for each cell of the plurality of cells; determining a road network based on the numbers of GPS points using a Smoothed Particle Hydrodynamics (SPH) analysis, wherein the cells of the plurality of cells are particles of the SPH analysis and the number of GPS points per cell of the plurality of cells are a scalar of each cell of the plurality of cells in the SPH analysis; and comparing the road network determined using the SPH analysis with the road network of the real space area.

15 Claims, 4 Drawing Sheets

(51) Int. Cl.
*G01S 19/39* (2010.01)
*G06N 3/045* (2023.01)
*G06V 10/26* (2022.01)
*G06V 10/82* (2022.01)

(56) References Cited

U.S. PATENT DOCUMENTS

| | | | |
|---|---|---|---|
| 2020/0200548 A1 | 6/2020 | Chawla | |
| 2020/0309541 A1* | 10/2020 | Lavy | G06V 20/588 |
| 2021/0406559 A1* | 12/2021 | Efland | G06V 10/803 |
| 2022/0207992 A1* | 6/2022 | Fowe | G08G 1/012 |

OTHER PUBLICATIONS

Huang X. et al., Grab-Posisi: An Extensive Real-Life GPS Trajectory Dataset in Southeast Asia. PredictGIS'19: Proceedings of the 3rd ACM SIGSPATIAL International Workshop on Prediction of Human Mobility, Nov. 5, 2019, pp. 1-10[Retrieved on Apr. 6, 2022] <DOI: 10.1145/3356995.3364536> the whole document especially section 4.1.1.

Helbing D., Derivation of Non-Local Macroscopic Traffic Equations and Consistent Traffic Pressures from Microscopic Car-Following Models. Physics and Society Preprint Archives: arXiv:0805.3400v1, May 22, 2008, pp. 1-9 [Retrieved on Apr. 6, 2022] the whole document.

Rosswog S. et al., "Car-SPH": A Lagrangian Particle Scheme for the Solution of the Macroscopic Traffic Flow Equations. Traffic and granular flow '99 : social, traffic, and granular dynamics, Sep. 29, 1999, pp. 1-6 [Retrieved on Apr. 6, 2022] the whole document.

Davies J.J. et al., Scalable, Distributed, Real-Time Map Generation. IEEE Pervasive Computing: Mobile and Ubiquitous Systems, Oct. 30, 2006, vol. 5, No. 4, pp. 47-54[Retrieved on Apr. 6, 2022] <DOI: 10.1109/MPRV.2006.83>the whole document.

Ronneberger et. al.: U-Net: Convolutional Networks for Biomedical Image Segmentation, 2015; arXiv:1505.04597, 8 pages.

Zhang et. al: "A fast parallel algorithm for thinning digital patterns" Communications of the ACM, Mar. 1984, vol. 27, No. 3, 4 pages.

Xingzhe Xie et. al : "Inferring Directed Road Networks from GPS Traces by Track Alignment", ISPRS International Journal of Geo-Information ISSN 2220-9964. Published Nov. 11, 2015; 26 pages.

Hengfeng Li et. al.: "Automatic Generation and Validation of Road Maps from GPS Trajectory Data Sets", Department of computing and Information Systems, The University of Melbourne; Oct. 2016; 10 pages.

Fathi et. al.: "Detecting Road Intersections from GPS Traces", GIScience 2010, Sixth International Conference of Geographic Information Science, Zurich, Sep. 14-17, 2010, 15 pages.

Wikipedia: "Smoothed-particle hydrodynamics" https://en.wikipedia.org/wiki/Smoothed-particle_hydrodynamics.

Xuemei Liu et. al.: Mining Large-Scale, Sparse GPS Traces for Map Inference: Comparison of Approaches, Publication Date: Aug. 12-16, 2012, Source: KDD '12: Proceedings of the 18th ACM SIGKDD international conference on Knowledge discovery and data mining, pp. 669-677, Author(s): Xuemei Liu, James Biagioni, Jakob Eriksson, Yin Wang, George Forman and Yanmin Zhu.

Zhao et. al: "OpenStreetMap Road Network Analysis for Poverty Mapping,".

Biagioni et. al.: "Inferring Road Maps from Global Positioning System Traces," Transportation Research Record Journal of the Transportation Research Board, pp. 61-71, Dec. 2012.

Wu et. al.: "A Novel Method of Missing Road Generation in City Blocks Based on Big Mobile Navigation Trajectory Data," International Journal of Geo-Information, vol. 8, Issue: 3, Mar. 14, 2019.

Funke et. al.: "Automatic Extrapolation of Missing Road Network Data in OpenStreetMap, "Proceedings of the 2nd International Workshop on Mining Urban Data, Lille, France, 2015, vol. 1392, Pages(s): 27-35, Jul. 2015.

* cited by examiner

METHOD, DATA PROCESSING APPARATUS AND COMPUTER PROGRAM PRODUCT FOR GENERATING MAP DATA

The present invention is a 371 of International Application No. PCT/SG2022/050001, filed on Jan. 3, 2023, and claiming priority to Singapore Application No. 10202100119S filed on Jan. 6, 2021, incorporated by reference herein in its entirety.

TECHNICAL FIELD

Various embodiments relate to a method for generating map data, thus identifying uncharted roads of a road network in a map. Various embodiments relate to a data processing apparatus configured to carry out said method for generating map data. Various embodiments relate to a non-transitory computer-readable medium storing computer executable code including instructions for generating map data. Various embodiments relate to a computer executable code including instructions for generating map data.

BACKGROUND

The most important map feature for navigation and for estimated time of arrival (ETA) calculation is considered to be the road network. However, some missing roads from the road network could lead to wrong outcomes both on navigation and estimated time of arrival (ETA) calculation.

Global Positioning System (GPS) traces collected by mobile phones when they are used in motor vehicles can offer a good indication about whether or not there is a road in that region. Therefore, in theory, GPS traces collected by mobile phones can be used to infer the road network—based on the paths, where motor vehicles have been—and further detect the roads not present in the reference map. However, there are multiple sources of errors when computing the signals from GPS that prevents using GPS signals directly to infer road networks. These errors are due to atmospheric effects, e.g. ionospheric delay, humidity, atmospheric pressure, and multipath effects, e.g. radio signals reflect off surrounding terrain, and satellite's clock errors, space weather, and other artificial sources of interference, etc. All those sources of errors can lead to so called GPS jumps or GPS drifts.

Conventionally, for using GPS traces with the purpose to infer road networks, intersections are identified and the geometric representation of each road segment by track alignment is extract. Further conventionally, spatial-linear clustering is used to infer road segments from GPS traces. Further conventionally, intersection detection that uses a localized shape descriptor to represent the distribution of GPS traces around a point is used. However, in of these conventional techniques, above-mentioned GPS errors create false positive signals leading to false positive roads detected. In particular, there is a high chance of encountering a Type I or Type II error when there are only a few GPS traces to support the detection of a road segment.

SUMMARY

In various aspects a method for generating map data is provided. The method may include generating of a plurality of cells of a real space area, each cell representing a two-dimensional sub-space of the real space area. Each of the cells include at least one global positioning system (GPS) point. The real space area may include a road network. The method may further include determining a number of GPS points for each cell of the plurality of cells. The method may further include determining a road network based on the numbers of GPS points using a Smoothed Particle Hydrodynamics (SPH) analysis. The cells of the plurality of cells may be particles of the SPH analysis and the number of GPS points per cell of the plurality of cells may be a scalar of each cell of the plurality of cells in the SPH analysis. The method may further include comparing the road network determined using the SPH analysis with the road network of the real space area, e.g. stored in map of the real space area.

Another aspect of the disclosure relates to various embodiments of a data processing apparatus configured to carry out the method of generating map data. As an example, the data processing apparatus may include at least one processor, and a memory having instruction stored therein that, when executed by the processor, cause the processor to: generate a plurality of cells of a real space area, each cell representing a two-dimensional sub-space of the real space area, wherein each of the cells comprise at least one global positioning system (GPS) point, and wherein the real space area comprises a road network; determine a number of GPS points for each cell of the plurality of cells; determine a road network based on the numbers of GPS points using a Smoothed Particle Hydrodynamics (SPH) analysis, wherein the cells of the plurality of cells are particles of the SPH analysis and the number of GPS points per cell of the plurality of cells are a scalar of each cell of the plurality of cells in the SPH analysis; and compare the road network determined using the SPH analysis with the road network of the real space area.

Another aspect of the disclosure relates to various embodiments of a non-transitory computer-readable medium storing computer executable code including instructions for the method of generating map data.

Another aspect of the disclosure relates to various embodiments of a computer executable code including instructions carrying out the method of generating map data.

Illustratively, roads are considered as continuous surfaces, and when roads are mapped, roads become continuous two-dimensional (2D) surfaces. Recorded GPS points can be considered as a cloud of discrete particles. In various aspects, a method to map the particle's cloud to the road continuous surface is provided. As an example, the method may be based on Smoothed Particle Hydrodynamics (SPH) applied to generate a road network.

The method may include splitting 2D spaces of a map into regular grids. Each grid cell, where at least one GPS point is available, may become a particle. The scalar property of a particle may be the number of GPS points recorded.

The method may further include determining of a density field underlying the scalar property. The density field may be traced by particles using a SPH simulation. The method may further include providing a visualization image for the density field obtained after simulation.

The method may further include a classifying of each pixel from the resulting image, e.g. using a deep neural network, as a part of a road or not.

The method may further include to generate a network topology with geo-coordinates attributes from resulted binary mask classifying of each pixel. The method may further include a comparison of the resulting network with a reference road network. The method may further include identifying missing roads in the reference map.

The method may be applied when there is not a huge volume of GPS traces from the same road segment available.

Illustratively, when there is a huge volume of GPS traces from the same road segment available, the average of the signals can give a good indication about the presence and the geometry of the road segment, due to the law of large numbers.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the enclosure assemblies, vehicles, or methods are analogously valid for the other enclosure assemblies, vehicles, or methods. Similarly, embodiments described in the context of an enclosure assembly are analogously valid for a vehicle or a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

As used herein, the term "new road segments", "missing road segments", or "uncharted road segments" refer to real space road segments that are not considered in a road network of a map of the real space area including the real space road segments.

As used herein, the term smoothed-particle hydrodynamics (SPH) analysis refers to a computational method used for simulating the mechanics of continuum media and is a meshfree Lagrangian method, and the resolution of the method may easily be adjusted with respect to variables such as the size of the cells or the number of GPS points per cell.

As used herein and in accordance with various embodiments, the expression "method for" may also include the meaning of "method of", and vice versa.

As used herein and in accordance with various embodiments, the term "cell" may include geographical data, such as geospatial coordinate and may further include time, for example, as provided by the global positioning system GPS. The GPS coordinates may according to the World Geodetic System, WGS 84, for example, version G1674.

For the identification of uncharted road segments, the location data is real world data, for example real world GPS data. Correspondently, the geographical perimeter represents a perimeter on earth's surface.

As used herein and in accordance with various embodiments, the terms 'geographical' and 'geospatial' may be used interchangeably.

The service of ride-hailing providers relies significantly on the quality of the digital map. The missing of a road segment from the map can lead to suboptimal routing decision or inaccurate estimation of a driver's arrival time. Though OpenStreetMap (OSM) provides the community user-generated maps of the world, its data completeness and accuracy vary significantly in different cities. Considering the high cost of manual corrections of map data, using data automation may provide advantages for providing accurate maps. For example, data-driven approaches can learn from cities with relatively higher quality map data (e.g., Singapore) to automatically discover missing roads and intersections in cities with relatively poorer map data (e.g., Jakarta). To this end, various embodiments of the present disclosure use a multi-scale graph convolutional network that can effectively detect uncharted road segments from large-scale GPS trajectories.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The method may include that a 2D space is split in cells, e.g. geohashes, e.g. with a length of 9, 4.77 m×4.77 m. Grid cells having no GPS points may have no particle assigned. Grid cells having at least one GPS point may have a particle assigned. The number of GPS points, e.g. as they were collected by mobile phones, may the scalar property of a particle. Alternatively, a density may be selected from one timeframe. In various aspects, all GPS points may have the same weight in the method regardless of their source or age. The method may further include, e.g. after this step, a scalar for each geohash representing its GPS points density may be provided. SPH may be configured to reconstruct a continuous field from a cloud of discrete particles which may be the property carriers.

SPH may be configured such that the volume of each particle is set to a constant, e.g. one. SPH may include a kernel that may be a Dome-shaped quadratic smoothing function.

In SPH, particles may interact through a kernel function (W) with characteristic radius, also denoted as "smoothing length". The smoothing length may be represented in equations by h. As an example, $W(R, h) = \alpha_d(1-R^2)$ with $\alpha_d = 15/8(\pi h^3)$. Here, "h" is a smoothing length, "R" is the relative distance between two points: $R=r/h$, and "r" is the distance between the two points: $x_i$ and $x_{i+1}$. The smoothing length may be variable. The value for each particle may be determined as the distance to its $16^{th}$ closer neighbors. Here, the position of a particle would be the center of a geohash. The resulting field may be interpreted according to various aspects as a drivable area field. A high value of the area field in a certain point may be interpreted as a high probability of having a road there and vice-versa, as an example.

In various aspects, a GPS density of any particle of the particles may be determined by summing the GPS density of all the particles that lie within the range of the kernel, the kernel being used as a weighting function W.

Hence, A(r) field may be written as a convolution with W:

$$A(r) = \int A(r') W(r, r', h) dV(r').$$

Here, A(r) may be the integral interpolant of one or more reconstructed GPS traces density. A(r') may be the local value for GPS traces density where the integration is over the entire circle having radius smoothing length.

For numerical work the integral interpolant may be approximated by a summation interpolant:

$$A(r) = \Sigma_j V_j A_j W(r, r', h).$$

Here, the summation index "j" may denote a particle label, and the summation may be over all the particles localized in the circle of radius "smoothing length". Vj may be the volume of particle j. The volume Vj may be set to a constant value of 1. Aj may represent the value of a GPS density, e.g. the scalar, in the point j.

The accuracy of the field reconstruction may be determined by a first factor and a second factor. A first factor may be how accurate particles are distributed over the 2D space. A second factor may be how good the estimated density of particles is. The first factor and second factor may be are derived directly from measurements.

The properties of a kernel function used to interpolate the discrete particles may include a Dome-shaped quadratic smoothing function. A variable "smoothing length" may be used instead of a constant in case of a huge variability in GPS points density in similar roads.

In various aspects, the smoothing length of each particle of the particles may be determined, e.g. computed, as the distance to its "nb" closer neighbor. Here, nb may be a constant in a range of 2 to 20, e.g. having value of 16. The result of this procedure may be a field of GPS point density. The GPS point density may be interpreted as road existence probability density function, e.g. a probability of being a road in any point in 2D space. Illustratively, the input to the SPH may represent an unprocessed heatmap built from the GPS points, and the output may be a normalized heatmap. In the heatmap, the roads may be clearly visible.

Figure 1:
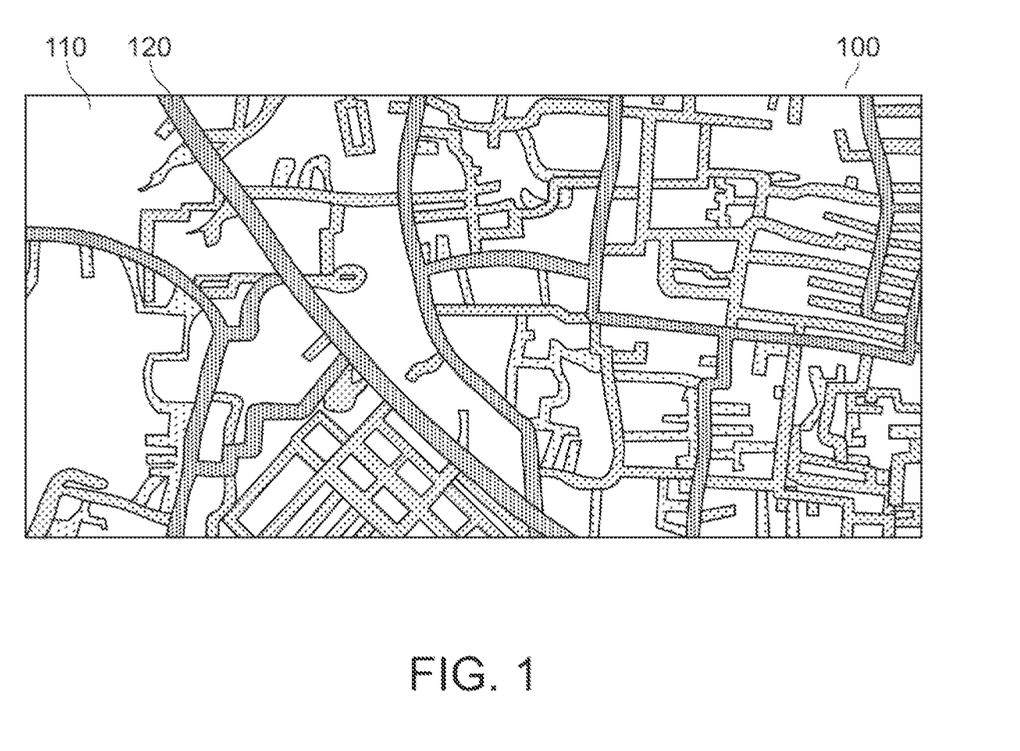
FIG. 1 to FIG. 3 show representations of a method of generating map data.

In various aspects, a surface density of the distribution of particles may be plotted to generate visualizing images for the density field obtained after simulation, e.g. using a Py-SPHViewer library. A resulting image may be depicted in FIG. 1. The generated image 100 may act as an input into a semantic segmentation model, e.g. a deep learning machine learning. The generated image 100 may include first areas 120 that are associated with roads (in FIG. 1 illustrated as bright areas), and may include second areas 110 that are associated with non-road areas 110, e.g. a building, a park, a pedestrian zone, etc. (in FIG. 1 illustrated as dark area).

The purpose of the semantic segmentation model may be to learn the transformation of roads from feature space of road confidence that was generated before to the feature space of road-not road classification at pixel level.

In various aspects, the semantic segmentation model may include a dataset used for train, test and evaluation. The dataset may be generated by labeling all roads where received GPS points exist. Labels may be obtained by querying the OSM, and by retrieving all existing geometries.

The geometries in an image may than be converted by drawing the lines on an empty canvas, and, thus, a binary image may be obtained. In the binary image, each pixel may have a first label and a second label. For example, the first label may be "road" and the second label may be "not road". OSM may be queried on areas where OSM data has a very good quality.

The input images for a dataset may be obtained on selected OSM areas on top of already collected GPS points by the process steps described before. Thus, images may be generated as described before.

In various aspects, a Convolutional Network for Semantic Segmentation, e.g. a U-Net architecture-model may be trained. In the U-Net architecture, a resnet18 backbone may be used. The resnet18 backbone may provide an optimal accuracy-speed tradeoff.

An evaluation metric may be used in pixel-wise accuracy. The result may be a model able to predict at pixel level whether a road exists on that pixel or not.

Figure 2:
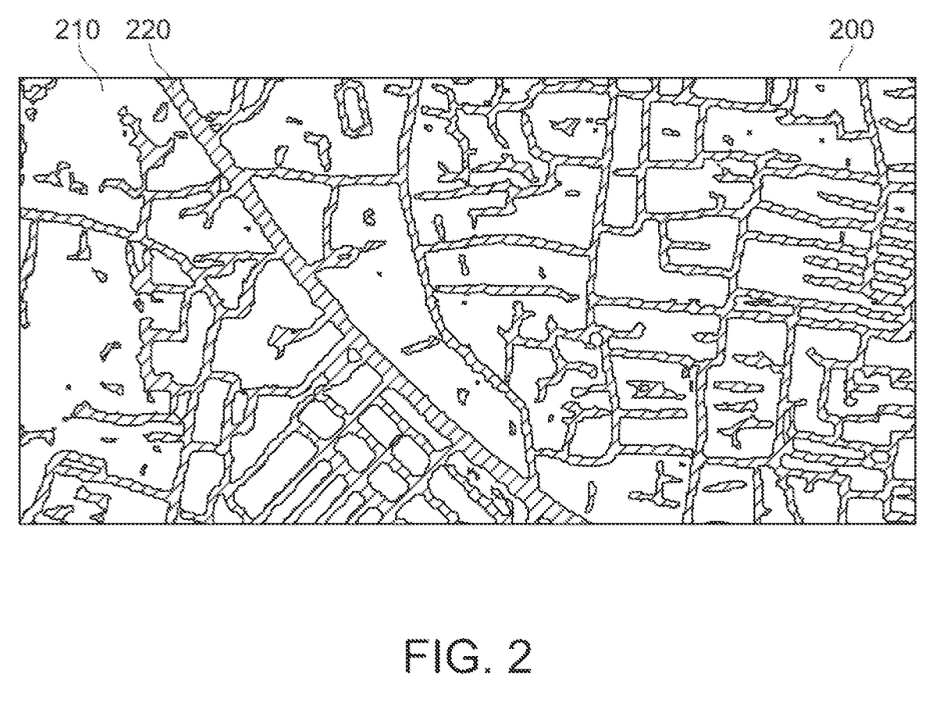

When running an inference, each pixel may be classified as a part of a road. Alternatively, a binary mask having the same shape may result as an input image. An output from a neural network may be used, in which for each pixel there may be a probability of being a road, and the output may be binarized by applying a confidence threshold. The confidence threshold may be equal to 0.2. An example of an output is illustrated in FIG. 2. The generated image 200 may include first areas 220 that are associated with roads, and may include second areas 110 that are associated with non-road areas 110, e.g. a building, a park, a pedestrian zone, etc.

The binary mask may be used to generate a network topology. Each edge may represent a road using a skeletonization algorithm implemented in an image processing library. The result may be a road network having a graph representation where each node may have a correspondent geo-position, and edges may represent road segments.

The resulting network illustrated in a first map may be compared with a reference road network derived from a reference map in a second map, the second map may be the map of the real space area.

All segments presented in the first map and missing in the second map may be considered as being roads missing from the reference map/second map.

The comparison of the first map with the second map may be performed by taking each predicted road segment and checking whether there are existing roads in its proximity, for example.

In various aspects, a buffer around all the roads which already exist in the map may be used. Then, an intersection between a new missing roads segment and a road segment in the buffer may be computed. As an example, a confidence value may be assigned to the intersection depending on the intersection percentage between the missing road and the road segment in the buffer. The confidence value may represent a probability of the road to be missing or not. As an example, Confidence 1 may have an intersection percentage <0.25 and missing roads with high confidence, Confidence 2 may have an intersection percentage between 0.25 and 0.5 and missing roads with medium confidence, Confidence 3 may have an intersection percentage between 0.5 and 0.75 and missing roads with low confidence, and Confidence 4 may have an intersection percentage >0.75 of existing roads. In an output 300, illustrated in FIG. 3, each segment may be color-coded by its degree of confidence, e.g. Confidence 1 330, Confidence 2 340, Confidence 3 350, and Confidence 4 320. Non-road areas 310 may have no color code.

Figure 3:
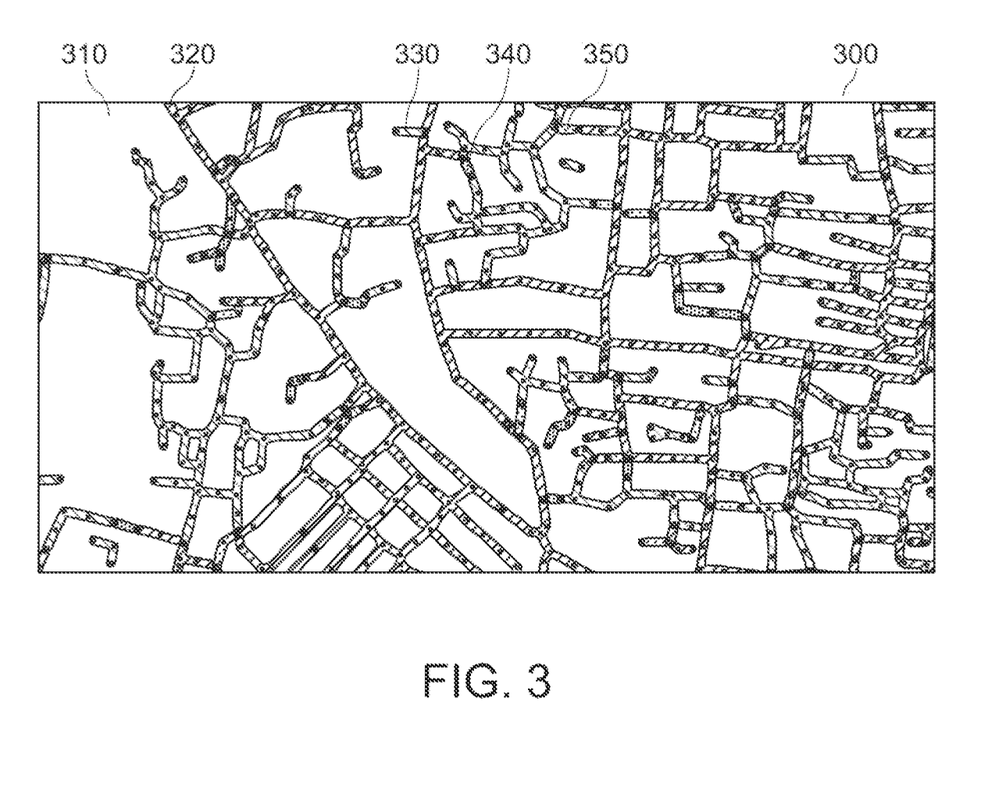

In the illustrative Example depicted in FIG. 3, a map of the metropolitan area of Bandung city from Indonesia is shown on the area defined by the following geo-coordinates: Top Left: −6.8553718, 107.5340093, Bottom Right: −6.9916266, 107.6685388, Geohashes: qqu2z qqu8b qqu8c qqu2x qqu88 qqu89 qqu2r qqu82 qqu83. FIG. 3 illustrates a detected total a road network of 4069 km out of which: missing roads with high confidence 330: 495 km (Confidence 1), missing roads with medium confidence 340: 196 km (Confidence 2), missing roads with low confidence 350: 160 km (Confidence 3), and existing roads 320: 3219 km (Confidence 4).

Figure 4:
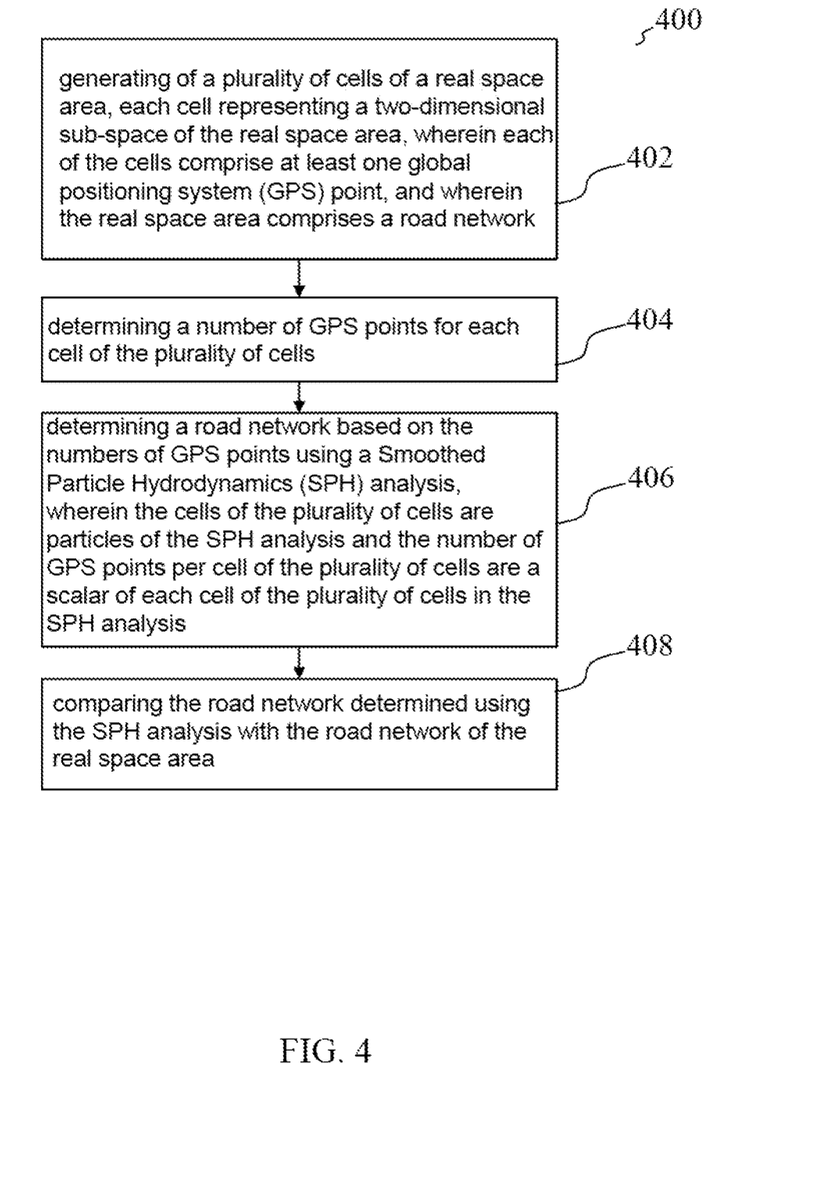
FIG. 4 exemplary shows a flow diagram of a method for generating map data according to various aspects.

Illustratively, FIG. 4 depicts a flow diagram of a method 400 for generating map data according to various aspects. The method 400 may include generating 402 of a plurality of cells of a real space area, each cell representing a two-dimensional sub-space of the real space area. Each of the cells include at least one global positioning system (GPS) point. The real space area may include a road network. The method may further include determining 404 a number of GPS points for each cell of the plurality of cells. The method may further include determining 406 a road network based on the numbers of GPS points using a Smoothed Particle Hydrodynamics (SPH) analysis. The cells of the plurality of cells may be particles of the SPH analysis and the number of GPS points per cell of the plurality of cells may be a scalar of each cell of the plurality of cells in the SPH analysis. The method may further include comparing 408 the road network determined using the SPH analysis with the road network of the real space area.

In various aspects, the method may further include determining a first plurality of cells. The first plurality of cells may include the plurality of cells and at least one further cell. The at least one further cell may include no GPS point.

The GPS points may be provided from a plurality of mobile phone users in the real space area.

The cells of the plurality of cells may include that the cells may be spaces of a grid. Each cell may include the same size. Each cell may be a Geohash. Each of the GPS point of a cell may have the same weight as the other GPS points of the same cell.

Determining the road network may include a reconstructing of a continuous field from the plurality of cells. The continuous field may be interpreted as a drivable area field. A high value of the continuous field in a certain point of the real space area may be interpreted as a high probability of having a road in the point. A number of GPS points per cell may be interpreted as road existence probability density function. The input to the SPH analysis may represent an unprocessed heatmap built from the GPS points of each cell and the output may be a normalized heatmap. At least one visualization image for the distribution of number of GPS points per cell may be obtained after simulation. Each pixel from the resulting visualization image may be classified to determine whether the pixel may be a part of a road or not. The classifying may be using a deep neural network model with the visualization image as an input into a semantic segmentation. A dataset may be provided by labelling all roads where GPS points exist. Labels may be obtained by querying an open street map (OSM) and retrieving all existing geometries. A binary image may be generated in which every pixel may have a first label associated to a road or a second label associated to a non-road area by converting the geometries in the image by drawing a plurality of lines on an empty canvas. A convolutional network for semantic segmentation may be trained. The method may include the semantic segmentation. An inference may be run where each pixel may be classified having the first label or the second label resulting in a binary mask. The resulting binary mask may have the same shape as the input image. A network topology may be generated from the resulting binary mask. The network topology may include geo-coordinates attributes. The road network may include a graph representation with each node having a correspondent geo-position and edges represent road segments. The road segments presented in the road network determined by the SPH analysis may be considered as roads missing in the map of the real space area. It may be determined whether there may be existing roads in a proximity of new road segments determined by SPH analysis. A buffer around road segments known from the map of the real space area may also be determined. An intersection between uncharted road segments of the real space area road network and the buffer may be determined depending on the intersection percentage between the missing road (also denoted as uncharted road) and the one stored in the buffer (e.g. the road network stored in the buffer). A confidence value may be determined for the intersection percentage. A color-coding output representing missing roads may be provided with different labels, e.g. high confidence, medium confidence or low confidence.

As an example, the method may include a pre-processing of GPS data for the purpose of missing road detection, a splitting of 2D spaces into regular grids (also denoted as plurality of grid cells or grid cells), e.g. splitting in geohashes. The method may further include, for each grid cell, if there exists at least one GPS point, that the cell becomes a particle and that the grid cells having no GPS points will have no particle assigned. The method may further include a recording of the scalar property of particle being the number of GPS points such that all GPS points have the same weight or that, for each geohash, a scalar representing its GPS points density. The method may further include an estimating of the underlying density field traced by particles using Smoothed Particle Hydrodynamics (SPH) simulation by reconstructing a continuous field from a cloud of discrete particles. The resulting field may be interpreted as a drivable area field with the high value of the field in a certain point interpreted as a high probability of having a road there and vice-versa. The result of this step may be a field of GPS points density which can be interpreted as road existence probability density function (probability of being a road in any point in 2D space). The input to the SPH may represent an unprocessed heatmap built from the GPS points and the output may be a normalized heatmap in which the roads are much more clearly visible. The method may further include a generating of visualization images for the density field obtained after simulation by plotting surface density of particles distribution. The method may further include a classifying of each pixel from the resulting visualization image to determine whether the pixel is a part of a road or not using a deep neural network model with the visualization image as an input into a semantic segmentation. The method may further include a building of a dataset by labeling all roads where GPS points exist where the labels are obtained by querying the open street map (OSM) and retrieving all existing geometries, converting the geometries in the image by drawing the lines on an empty canvas, thus obtaining a binary image in which every pixel has two labels: road/not road, training a convolutional network for (7c1) semantic segmentation, and running inference where each pixel is classified as a part of a road or not resulting in a binary mask having the same shape as input image. The method may further include, from a resulted binary mask, generating a network topology with geo-coordinates attributes where the road network having a graph representation with each node having a correspondent geo-position and edges represent road segments. The method may further include comparing the resulting network with a reference road network and identifying missing roads in the reference map where the road segments presented in the resulting network and missing in the reference network are considered as roads missing from the reference map, taking each predicted road segment and checking whether there are existing roads in its proximity, computing a buffer around all the roads which already exist in the map and then computing the intersection between a new missing roads segment and that buffer, and depending on the intersection percentage between the missing road and the buffer, assigning a confidence value to it, which represents the probability of the road to be missing or not. The method may further include a color-coding output representing missing roads with high/medium/low confidence.

The present disclosure also relates to a computer program product configured to carry out the method for generating map data according to various embodiments.

The present disclosure also relates to a data processing apparatus configured to carry out the method for generating map data according to various embodiments.

The data processing apparatus may include a processor, e.g. a microprocessor, a memory, communication devices, e.g. to enable access to a network.

The present disclosure also relates to a non-transitory computer-readable medium storing computer executable code including instructions for identifying road intersections according to various embodiments. Examples of non-transitory computer-readable medium are a flash memory, a hard disk drive, a CD-ROM, a DVD.

The present disclosure also relates to a non-transitory computer-readable medium storing computer executable code including instructions for training the classifier.

Examples of non-transitory computer-readable medium are a flash memory, a hard disk drive, a CD-ROM, a DVD.

The data processing apparatus includes at least one processor, and a memory having instruction stored therein that, when executed by the processor, cause the processor to: generate a plurality of cells of a real space area, each cell representing a two-dimensional sub-space of the real space area, wherein each of the cells comprise at least one global positioning system (GPS) point, and wherein the real space area comprises a road network; determine a number of GPS points for each cell of the plurality of cells; determine a road network based on the numbers of GPS points using a Smoothed Particle Hydrodynamics (SPH) analysis, wherein the cells of the plurality of cells are particles of the SPH analysis and the number of GPS points per cell of the plurality of cells are a scalar of each cell of the plurality of cells in the SPH analysis; and compare the road network determined using the SPH analysis with the road network of the real space area.

While several aspects and embodiments refer to road segments, the present aspects and embodiments may as well be applied to other kinds of way segments, for example, bikeways segments, pedestrian ways segments, shared use intersections.

Shared use may be, e.g., selected from at least two of: bikeways intersections, pedestrian ways intersections, motorized vehicles roads intersections. Thus, the term 'road' as used herein, and in accordance with various embodiments, may also mean a way or a path.

The invention claimed is:

1. A method for generating map data, the method comprising:
    receiving a request to generate an updated map associated with a road network;
    generating of a plurality of cells of a real space area, each cell representing a two-dimensional sub-space of the real space area the at least one GPS point received from at least one of a plurality of GPS devices, wherein each of the cells comprise at least one global positioning system (GPS) point, and wherein the real space area comprises the road network;
    determining a number of GPS points for each cell of the plurality of cells;
    determining a simulated road network based on the numbers of GPS points by analyzing the GPS points using a Smoothed Particle Hydrodynamics (SPH) analysis, wherein the cells of the plurality of cells are particles of the SPH analysis and the number of GPS points per cell of the plurality of cells are a scalar of each cell of the plurality of cells in the SPH analysis;
    generating at least one visualization image for the distribution of number of GPS points per cell based on the SPH analysis;
    updating the simulated road network by classifying each pixel from the generated at least one visualization image to determine whether the pixel is part of a road or not;
    providing an input dataset of the road network by labelling all roads where GPS points exist, wherein labels are obtained by querying an open street map (OSM) and retrieving all existing geometries;
    generating a binary image in which every pixel has a first label associated to a road or a second label associated to a non-road area by converting the geometries in the image by drawing a plurality of lines on an empty canvas;
    comparing the simulated road network determined using the SPH analysis with the road network of the real space area to identify a first set of road segments that exist in the simulated road network that do not exist in the road network of the real space area; and
    generating an updated map including the first set of road segments and the road network of the real space area.

2. The method of claim 1, further comprising:
    determining a first plurality of cells, wherein the first plurality of cells includes the plurality of cells and at least one further cell, wherein the at least one further cell comprises no GPS point.

3. The method of claim 1, further comprising:
    providing GPS points from a plurality of mobile phone users in the real space area.

4. The method of claim 1,
    wherein the cells of the plurality of cells comprise are spaces of a grid, wherein each cell comprises the same size.

5. The method of claim 4,
    wherein each cell is a Geohash.

6. The method of claim 1,
    wherein each of the GPS point of a cell has the same weight as the other GPS points of the same cell.

7. The method of claim 1,
wherein determining the road network comprises a reconstructing of a continuous field from the plurality of cells, wherein the continuous field is interpreted as a drivable area field.

8. The method of claim 7,
wherein a high value of the continuous field in a certain point of the real space area is interpreted as a high probability of having a road in the point.

9. The method of claim 1,
wherein determining the road network comprises a number of GPS points per cell interpreted as road existence probability density function.

10. The method of claim 1,
wherein the input to the SPH analysis represents an unprocessed heatmap built from the GPS points of each cell and the output is a normalized heatmap.

11. The method of claim 1, further comprising:
wherein the classifying is using a deep neural network model with the visualization image as an input into a semantic segmentation.

12. The method of claim 1,
wherein the road segments presented in the road network determined by the SPH analysis are considered as roads missing in the map of the real space area.

13. The method of claim 1, further comprising:
determining whether there are existing roads in a proximity of new road segments determined by SPH analysis.

14. A data processing apparatus configured to carry out a method for generating map data, the method comprising:
receiving a request to generate an updated map associated with a road network;
generating of a plurality of cells of a real space area, each cell representing a two-dimensional sub-space of the real space area, wherein each of the cells comprise at least one global positioning system (GPS) point the at least one GPS point received from at least one of a plurality of GPS devices, and wherein the real space area comprises the road network;
determining a number of GPS points for each cell of the plurality of cells;
determining a simulated road network based on the numbers of GPS points by analyzing the GPS points using a Smoothed Particle Hydrodynamics (SPH) analysis, wherein the cells of the plurality of cells are particles of the SPH analysis and the number of GPS points per cell of the plurality of cells are a scalar of each cell of the plurality of cells in the SPH analysis;
generating at least one visualization image for the distribution of number of GPS points per cell based on the SPH analysis;
updating the simulated road network by classifying each pixel from the generated at least one visualization image to determine whether the pixel is part of a road or not;
providing an input dataset of the road network by labelling all roads where GPS points exist, wherein labels are obtained by querying an open street map (OSM) and retrieving all existing geometries;
generating a binary image in which every pixel has a first label associated to a road or a second label associated to a non-road area by converting the geometries in the image by drawing a plurality of lines on an empty canvas;
comparing the simulated road network determined using the SPH analysis with the road network of the real space area to identify a first set of road segments that exist in the simulated road network that do not exist in the road network of the real space area; and
generating an updated map including the first set of road segments and the road network of the real space area.

15. A non-transitory computer-readable medium storing computer executable code comprising instructions for generating map data according to a method for generating the map data, the method comprising:
receiving a request to generate an updated map associated with a road network;
generating of a plurality of cells of a real space area, each cell representing a two-dimensional sub-space of the real space area, wherein each of the cells comprise at least one global positioning system (GPS) point the at least one GPS point received from at least one of a plurality of GPS devices, and wherein the real space area comprises the road network;
determining a number of GPS points for each cell of the plurality of cells;
determining a simulated road network based on the numbers of GPS points by analyzing the GPS points using a Smoothed Particle Hydrodynamics (SPH) analysis, wherein the cells of the plurality of cells are particles of the SPH analysis and the number of GPS points per cell of the plurality of cells are a scalar of each cell of the plurality of cells in the SPH analysis;
generating at least one visualization image for the distribution of number of GPS points per cell based on the SPH analysis;
updating the simulated road network by classifying each pixel from the generated at least one visualization image to determine whether the pixel is part of a road or not;
providing an input dataset of the road network by labelling all roads where GPS points exist, wherein labels are obtained by querying an open street map (OSM) and retrieving all existing geometries;
generating a binary image in which every pixel has a first label associated to a road or a second label associated to a non-road area by converting the geometries in the image by drawing a plurality of lines on an empty canvas; and
comparing the simulated road network determined using the SPH analysis with the road network of the real space area to identify a first set of road segments that exist in the simulated road network that do not exist in the road network of the real space area; and
generating an updated map including the first set of road segments and the road network of the real space area.

* * * * *